(12) United States Patent
Sobocinski

(10) Patent No.: US 9,062,657 B2
(45) Date of Patent: Jun. 23, 2015

(54) HORIZONTALLY ORIENTED WIND TURBINE

(76) Inventor: Eugene Lawrence Sobocinski, Shelby Township, MI (US)

( * ) Notice: Subject to any disclaimer, the term of this patent is extended or adjusted under 35 U.S.C. 154(b) by 864 days.

(21) Appl. No.: 13/195,969

(22) Filed: Aug. 2, 2011

(65) Prior Publication Data

US 2013/0034440 A1 Feb. 7, 2013

(51) Int. Cl.
*F03D 3/06* (2006.01)
*F03B 17/06* (2006.01)

(52) U.S. Cl.
CPC .............. *F03D 3/067* (2013.01); *F03B 17/065* (2013.01); *F05B 2210/16* (2013.01); *Y02E 10/74* (2013.01); *Y02E 10/28* (2013.01)

(58) Field of Classification Search
CPC ........... F03D 3/067; F03D 3/068; F03D 7/06; F03B 17/065; F03B 17/067; F03B 15/06; F03B 15/08; F03B 15/12
USPC ............... 416/105, 106, 107, 17, 41, 46, 111, 416/112, 118, 119, 136, 138, 140, 201 R, 416/210 A, 211, 235, 236 R, 500
See application file for complete search history.

(56) References Cited

U.S. PATENT DOCUMENTS

| | | | | |
|---|---|---|---|---|
| 4,255,085 A | * | 3/1981 | Evans | 416/197 A |
| 4,293,274 A | * | 10/1981 | Gilman | 416/51 |
| 4,383,801 A | * | 5/1983 | Pryor | 416/17 |
| 4,430,044 A | * | 2/1984 | Liljegren | 416/119 |
| 4,496,283 A | * | 1/1985 | Kodric | 416/44 |
| 7,083,382 B2 | * | 8/2006 | Ursua | 416/110 |
| 8,272,840 B2 | * | 9/2012 | Yan | 416/107 |
| 2010/0202883 A1 | * | 8/2010 | Daley et al. | 416/140 |

* cited by examiner

*Primary Examiner* — Dwayne J White
*Assistant Examiner* — Ryan Ellis
(74) *Attorney, Agent, or Firm* — Carlson, Gaskey & Olds

(57) ABSTRACT

A mill that reacts to fluid flow to create energy includes a vertically oriented hub and an arm attaching to and rotating with the hub in a horizontal plane. A plate is attached to the arm, and a vane cooperates with the plate. The vane includes a curved suction side, a planar pressure side, a leading edge, and a trailing edge. Within any 90 degree rotation of the arm, the vane rotates relative to the arm no more than 45 degrees.

17 Claims, 4 Drawing Sheets

HORIZONTALLY ORIENTED WIND TURBINE

BACKGROUND

Wind turbines today that generate power are typically complex machines that have a horizontal axis about which vanes rotate according to the principle of lift in reaction to wind. Typically, these windmills have complex mechanisms that allow them to turn to face the wind and have generators mounted on the horizontal axis. By mounting the generators on the horizontal axis, they must be placed high in the air which makes maintenance and repair difficult. These windmills may typically have up to 160 feet long vanes and extend 300 feet into the air, or more.

SUMMARY

According to an embodiment disclosed herein a mill that reacts to fluid flow to create energy includes a vertically oriented hub, an arm attaching to and rotating with the hub in a horizontal plane, a plate attaching to the arm, a vane cooperating with the plate, the vane having a curved suction side and a planar pressure side, a leading edge and a trailing edge.

An advantage of the embodiment disclosed is the ability of the mill to self adjust to fluid flow direction and speed.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
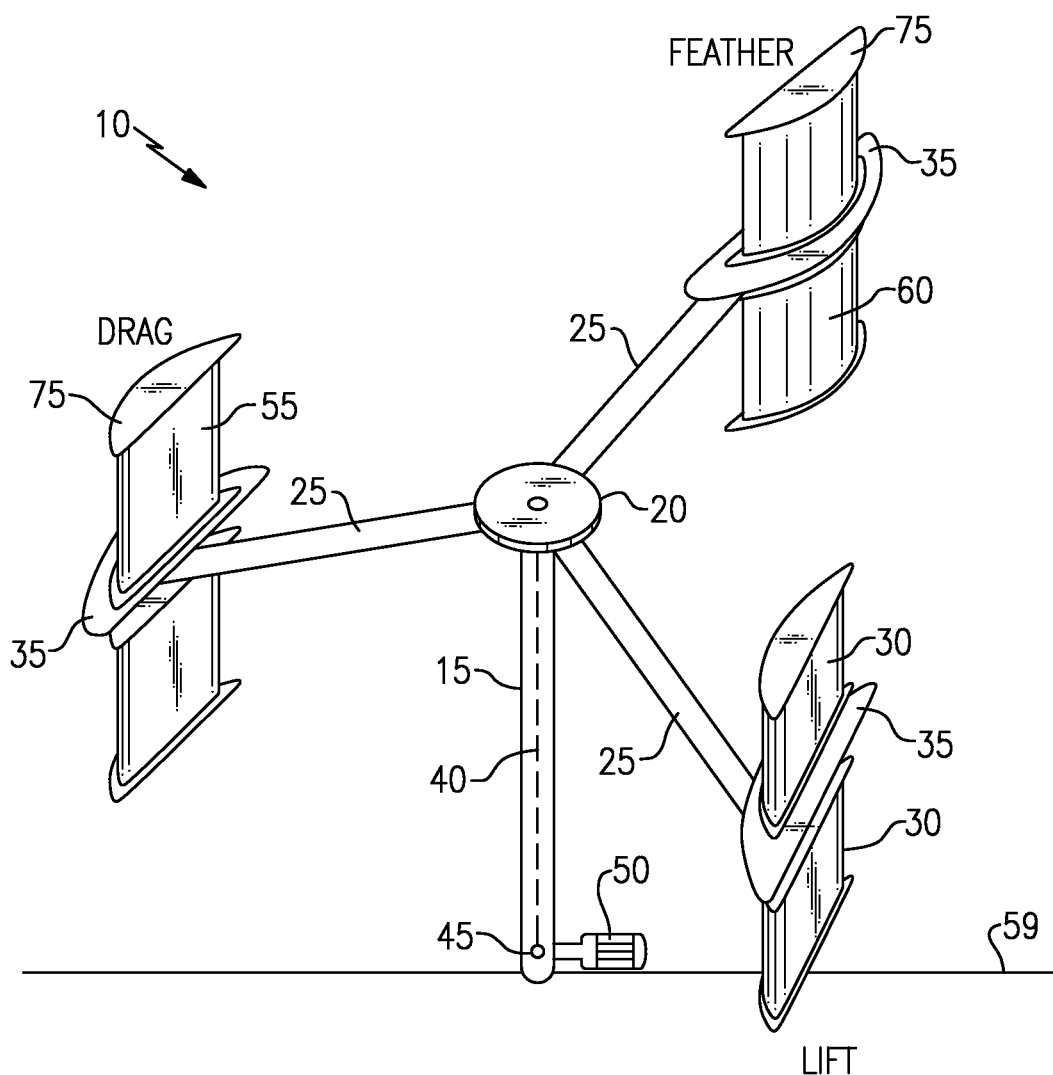
FIG. 1 shows a schematic view of an embodiment of a mill system employing a vertical axis.

Referring to FIG. 1, an embodiment of a mill 10 is shown. The mill 10 includes a vertically disposed post 15 supporting a rotatable hub 20 from which three (more or less) support arms 25 rotate, and a pair of vanes 30, each of the pair of vanes 30 supported by and attached to an arm 25 by a plate 35. The hub 20 is connected to a torque transmitter, such as tube 40, which extends downwardly within the post to a gear set 45 that transmits torque to a generator 50. Upon rotation of the vanes 30 in a horizontal plane, the torque tube 40 is rotated by the moving arms 25 and hub 20 and rotates the gear set 45 causing the generator 50 to rotate to create useable energy. The longer the arms 25 are, the greater the leverage on the torque tube 40. While the mill 10 shown may be used with a fluid such as wind, the mill 10 may be also used with other fluids such as, for example, water and other fluid flows. The plate 35 may be integral with an arm 25.

Figure 2:
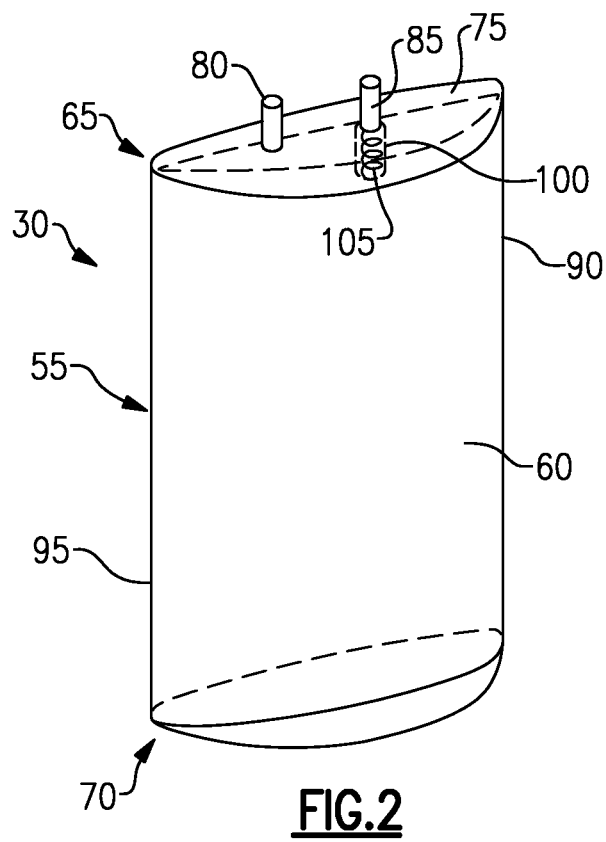
FIG. 2 shows a perspective view of a vane used in FIG. 1.
Figure 3:
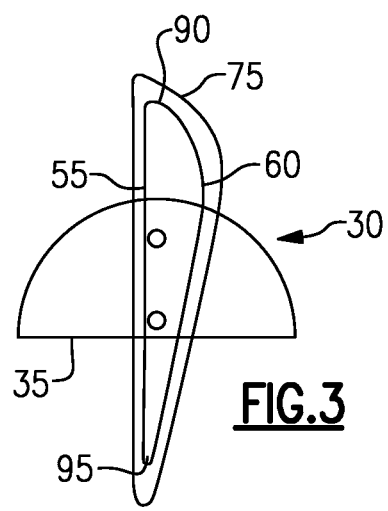
FIG. 3 shows a top cross-sectional view of the vane of FIG. 2.

Referring to FIGS. 2 and 3, a vane 30 is shown. Each vane 30 has a planar pressure side 55 and a curved suction side 60. The curve of the suction side is designed, as is known in the art, to maximize suction of the vane 30 in the environments in which the mill 10 is to be used.

The top 65 and the bottom 70 of the vane 30 is bounded by an anti-spill fairing 75 that prevents fluid from escaping above the top 65 and below the bottom 70 of the vane. Each vane 30 has a rotational axle 80 and a pivot pin 85 affixed thereto. Each vane has a leading edge 90 and a trailing edge 95. The pivot pin 85 is housed in opening 100 and is retractable therein. A spring 105 is disposed in the opening 100 to urge the pivot pin 85 out of the opening 100 though the pivot pin is retained therein by any known means. The pivot pin 85 may be pushed into the opening 100 should an over-speed condition occur, as will be discussed infra.

Figure 4:
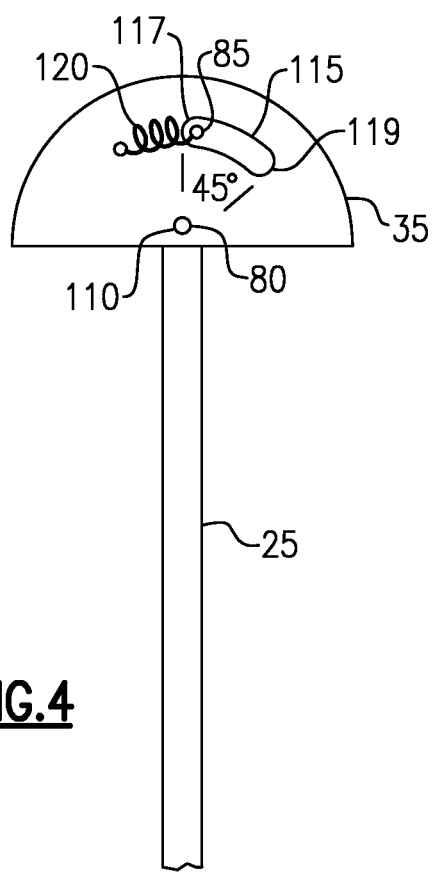
FIG. 4 shows a plate that supports the vanes used with the mill of FIG. 1.

Referring now to FIG. 4, the rotational axle 80 is retained in a hole 110 in the plate 35. The pivot pin 85 is located within an arced recess 115 for movement therein. The arced recess 115 has a first end 117 and a second end 119. A damper, such as spring 120 or the like, is bound to the plate 35 and to the pivot pin 85 to damp motion of the vane about the rotational axle 80 and within the arced recess 115. The rotational axle may extend through an angular plate 35 and gang with one or more vanes 30 above or below that vane (see FIG. 1) or not. The angular plate 35 attaches to the support beam by mechanical means such as bolts, welds or the like (not shown). The arced recess limits rotation of each vane 30 to about 45 degrees though other ranges of motion are contemplated for other applications. The vanes 30 may be ganged one atop the other as shown in FIG. 1. The spring 120 may act as a damper of vane 30 motion as the spring 120 expands and as it contracts with motion of the vane 30.

Figure 5:
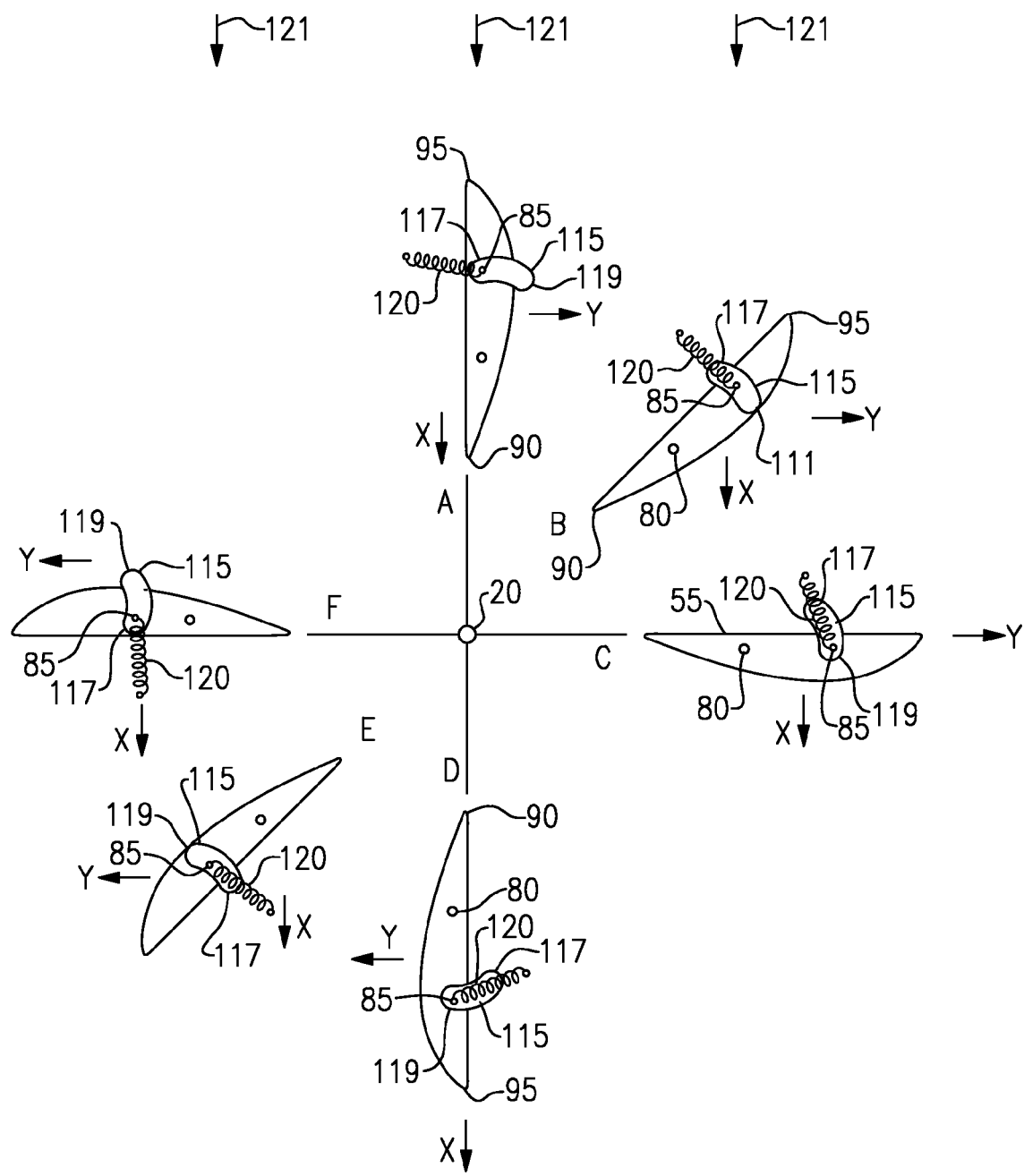
FIG. 5 shows the positions of the vanes in use in a mill as shown in FIG. 1.

Referring now to FIG. 5, operation of the mill 10 in different positions is shown. As can be seen, fluid 121, such as wind or water (though for purposes of illustration wind is described hereinbelow), flows from the top of the page down towards the bottom of the page. Each vane is shown in six different positions: position A is closest to the wind; position B is 45 degrees from position A; position C is 45 degrees from position B; position D is 90 degrees from position C and is the furthest downwind; position E is 45 degrees from position D; and position F is 45 degrees from position E. The vanes herein are shown as they react to the fluid flow and are not to scale but are drawn to illustrate the concepts presented herein. The plate 35 is not shown though arced recesses 115 in the plate 35 are shown for ease of illustration. Each vane 30 in each position has a drag force X in the direction of the wind and a lift force Y that is perpendicular to the wind. Drag force includes a pressure force of the fluid on the planar pressure side 55.

If a vane 30 is in position A, there is a small drag force X and a larger lift force Y that combine to urge the vane 30 and the arm 25, the hub etc. to move angularly clockwise. At that point, the pivot pin 85 is bottomed out on the first end 117 of the arced recess 115. As the vane 30 moves towards position B, the drag force X forces the vane to rotate within the arced recess 115 from first end 117 toward second end 119 thereof. There is a small lift force Y and a building relatively larger drag force X than in position A. In position A, the spring 120 is at rest in a relaxed position. In position B, the spring 120 starts to stretch to dampen motion of the vane 30 and minimize vibration within the mill 10. In position C, the pressure side of the vane is completely perpendicular to the flow of the wind thereby maximizing the drag force X to drive the arms 25 and vanes 30 rotationally clockwise. The spring 120 extending from the angular plate is fully extended. In position D, the vane 30 is in the feather position (see FIG. 1) in which drag force X is minimized and lift force Y continues to move the vane 30 angularly in the clockwise direction. The lift force Y in this position maintains the pivot pin against the second end 119. Note that the trailing edge 95 faces away from the wind 121. In position E, the drag force X is increasing and the lift force Y still provides some clockwise additional rotational force. The spring 120 in conjunction with the drag force X begins to move the rotational pin 85 towards the first end 117. In position F, the drag force X is maximized against clockwise rotational movement and the lift force Y provides no clockwise rotational force.

As the mill rotates, the lift force is more significant than the drag force which is minimized causing the vane to add rotated force in this condition.

The sum of the all of the forces on the mill as it rotates here around provides a self starting mechanism that will rotate quite nicely, including in light winds. From position A to position B, the vane uses lift to pull itself into a stall position at approximately position B. The stall position puts the vane into a high drag which lasts approximately 140 degrees at the circle that the mill travels. In a down position D, the vane assumes a tail first attitude to the wind for relatively neutral lift though some occurs.

Figure 6:
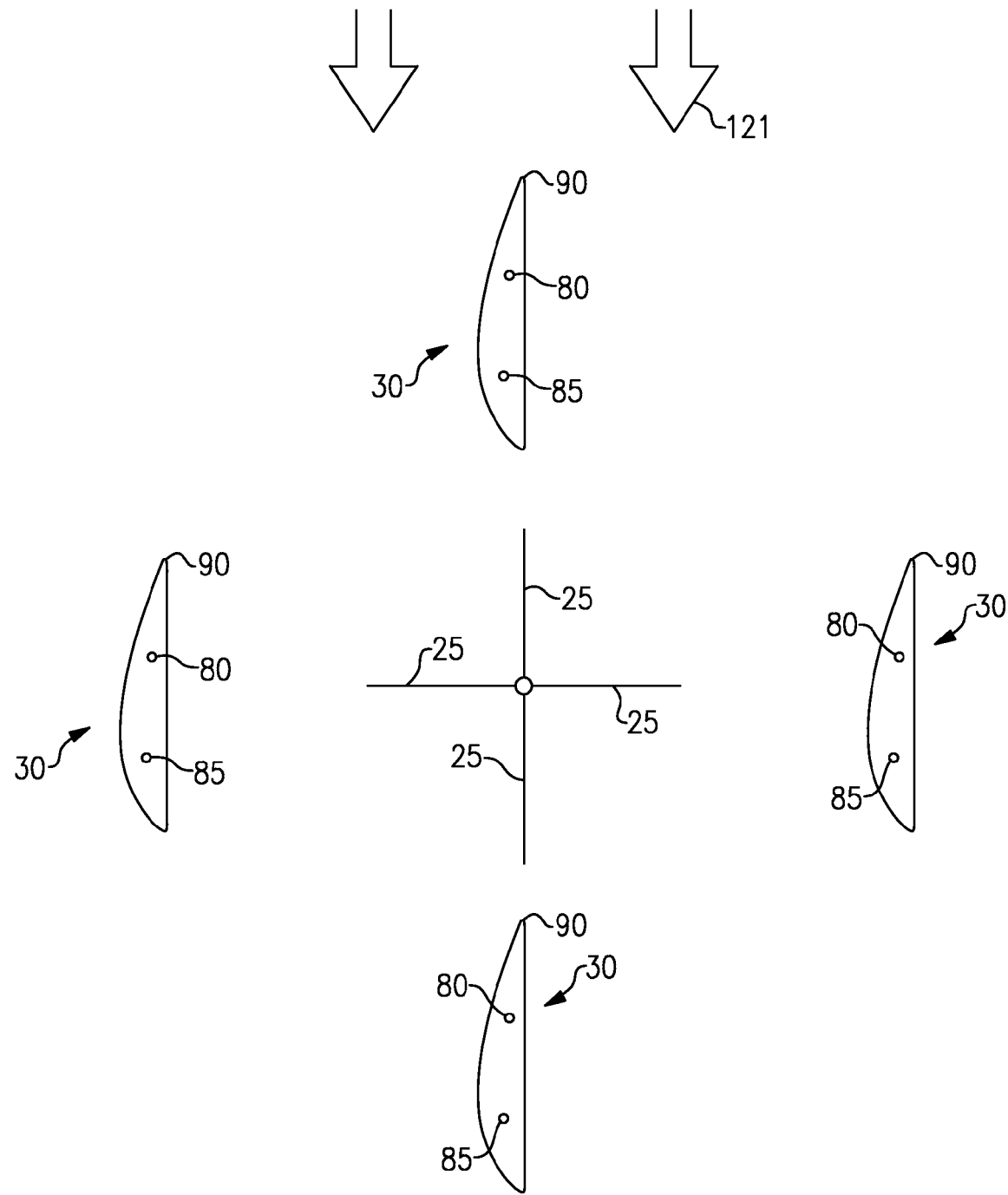
FIG. 6 shows a schematic view or the mill of FIG. 6 in an over speed condition.

Referring now to FIG. 6, the mill is shown where high velocity winds are shown and it may be unsafe to operate the mill 10. In this position, the pivot pins 85 are pushed into the openings 100 after the springs 120 are detached. The vanes 30 are then free to rotate without the limitation of the arced recesses 115 so that the trailing edges 95 of the vanes 30 face into the wind 121. In this feather position (see also FIG. 1), damage to the mill may be minimized After the high velocity winds subside, the pivot pins 85 may be released from a stored position to again engage the arced recesses 115 for further use.

The horizontal orientation of the vanes 30 in the mill 10 allow the mill 10 to be constructed at much lower heights than vertically oriented mills (not shown) thereby making maintenance and inspection far less costly. This is also true of the location of the generator 50 that is disposed at or near the ground (see FIG. 1)

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A mill reacting to fluid flow to create energy, the mill comprising:
    a vertically oriented hub;
    an arm attaching to and rotating with the hub in a horizontal plane;
    a vane situated on the arm to be movable relative to the arm and rotatable with the arm as the arm rotates in the horizontal plane, the vane having a curved suction side, a planar pressure side, a leading edge, and a trailing edge, the vane comprises an axle about which the vane may rotate;
    a control member comprising a pin that limits movement of the vane relative to the arm, wherein within any 90 degree rotation of the arm the vane rotates relative to the arm no more than about 45 degrees;
    the mill comprises a plate having an opening in which the pin traverses;
    the vane is moveable during rotation of the arm into
        a first position in which the trailing edge of the vane faces into the fluid flow,
        the pressure side is parallel to the fluid flow and the fluid flow across the suction side produces lift to urge the vane to rotate the hub, and
        a second position in which the pressure side is perpendicular to the fluid flow in which drag is maximized to urge the vane to rotate the hub;
    rotation of the vane about the axle is limited by interaction between the pin and the plate; and
    in the first position the pin is disposed against a first end of the opening and the pin is disposed against a second, opposite end of the opening when the vane is in the second position.

2. The mill of claim 1 comprising:
    a plate associated with the arm wherein said control member cooperates with said plate for limiting movement of the vane relative to the arm.

3. The mill of claim 2 wherein the vane comprises an axle about which the vane may rotate and the control member comprises a pin that is received in an opening in the plate.

4. The mill of claim 3 wherein the opening has ends that limit movement of the pin and thereby limit rotation of the vane about the axle.

5. The mill of claim 4 wherein the opening is arced.

6. The mill of claim 5 further comprising a damper attaching the vane to the plate, the damper damping rotation of the vane about the axle.

7. The mill of claim 6 wherein the damper attaches to the pin and to the plate.

8. The mill of claim 2, wherein
    the vane comprises an axle about which the vane may rotate and the control member comprises a pin situated to limit rotation of the vane about the axle when the pin protrudes beyond a surface of the vane;
    the plate comprises an arced recess configured to receive the pin for movement therein and a hole configured to receive an axle; and
    the vane is prevented from rotating more than 45 degrees with respect to the arm by the arced recess and the pin.

9. The mill of claim 8; wherein
    the vane is asymmetrical in that the suction side is curved and the pressure side is planar;
    the vane is movable during rotation of the arm from a first position to a second position, the arm rotating approximately 90 degrees from the first position to the second position;
    at the first position, the trailing edge of the vane faces into a fluid flow, the pressure side is generally parallel to the fluid flow and the fluid flow across the suction side produces lift to urge the vane to rotate the hub;
    at the second position, the pressure side is generally perpendicular to the fluid flow; and
    in the second position drag is maximized to urge the vane to rotate the hub.

10. The mill of claim 9, wherein
    the vane is movable during rotation of the arm from the second position to a third position, the arm rotating approximately 90 degrees from the second position to the third position; and at the third position, the leading edge faces into the fluid flow and the pressure side is generally parallel to the fluid flow wherein lift induces the vane to rotate the hub.

11. The mill of claim 1 wherein the vane has a fairing attached to at least one end of the curved suction side and the planar pressure side.

12. The mill of claim 1 wherein the vane comprises a first vane and a second vane wherein the first vane and the second vane are ganged vertically, and a plate is disposed between the first vane and the second vane.

13. The mill of claim 1,
wherein the vane is moveable into a third position in which the leading edge faces into the fluid flow, the pressure side is parallel to the fluid flow, and lift induces the vane to rotate the hub.

14. The mill of claim 1, wherein the vane is moveable during rotation of the arm into a stall position in which said vane is disposed between a first position in which the trailing edge of the vane faces into the fluid flow, the pressure side is parallel to the fluid flow and the fluid flow across the suction side produces lift to urge the vane to rotate the hub, and a second position in which the leading edge faces into the fluid flow and the pressure side is parallel to the fluid flow wherein lift induces the vane to rotate the hub.

15. The mill of claim 1 comprising:
a torque transmitter associated with said hub, and
a generator associated with said torque transmitter wherein rotation of said hub caused by rotation of said arm causes said generator to generate electrical power.

16. The mill of claim 1, comprising at least three arms each having at least one vane.

17. The mill of claim 1, wherein
the vane comprises an airfoil;
the suction side has a different contour than the pressure side;
the suction side is curved to facilitate lift for moving the vane and the arm; and
the pressure side is planar to facilitate drag for moving the vane and the arm.

\* \* \* \* \*